(12) United States Patent
Harada

(10) Patent No.: US 6,335,759 B1
(45) Date of Patent: Jan. 1, 2002

(54) PINHOLE VIDEO CAMERA

(76) Inventor: Nobuo Harada, 4-14-30, Isehara, Isehara-shi, Kanagawa 259-11 (JP)

(*) Notice: Subject to any disclaimer, the term of this patent is extended or adjusted under 35 U.S.C. 154(b) by 0 days.

(21) Appl. No.: 08/961,159

(22) Filed: Oct. 30, 1997

(30) Foreign Application Priority Data

Aug. 21, 1997 (JP) .............................................. 9-225245

(51) Int. Cl.⁷ ..................... H04N 5/225; H01L 31/0232; G02B 3/02; G02B 7/02
(52) U.S. Cl. ...................... 348/373; 348/340; 257/432; 359/709; 359/811
(58) Field of Search ................................ 348/335–342, 348/373–376, 82–83; 359/709, 811–815, 819; 257/432–434

(56) References Cited

U.S. PATENT DOCUMENTS

| | | | | |
|---|---|---|---|---|
| 4,257,670 A | * | 3/1981 | Legrand | 359/819 |
| 4,892,399 A | * | 1/1990 | Ahn | 359/431 |
| 5,125,750 A | * | 6/1992 | Corle et al. | 359/819 |
| 5,729,283 A | * | 3/1998 | Meyer et al. | 348/63 |
| 5,793,419 A | * | 8/1998 | Fraley | 348/376 |
| 5,831,668 A | * | 11/1998 | Hiroven et al. | 348/83 |
| 6,270,696 | * | 8/2001 | Jain et al. | 359/819 |

FOREIGN PATENT DOCUMENTS

| | | | | |
|---|---|---|---|---|
| GB | 2217174 | * | 9/1982 | G02B/23/00 |
| JP | 63-314081 | | 12/1988 | |
| JP | 01-319011 | * | 12/1989 | G02B/15/10 |
| JP | 7-281263 | | 10/1995 | |
| JP | 3020735 | | 11/1995 | |

* cited by examiner

Primary Examiner—Andrew B. Christensen
(74) Attorney, Agent, or Firm—Armstrong, Westerman, Hattori, McLeland & Naughton, LLP

(57) ABSTRACT

A pinhole camera in which a conical lens with an apical angle of 91.13° to 91.15° is used to correct the fisheye characteristics, and ⅓-inch fixed charged coupled device and a pinhole with a diameter of 0.8 mm are adopted to obtain clear image of a subject in an range from a point closely adjacent to the camera to a point far from the camera with strong contrast. The pinhole video camera comprising: a printed circuit board to which ⅓-inch fixed coupled charged device is attached; a holder fixed so as to cover a front surface of the coupled charged device of the printed circuit board; a lens holder having a pinhole with a diameter of 0.8 mm; a conical convex lens with an apical angle of 91.13° to 91.15°, the conical convex lens fixed on a rear face side of the pinhole of the lens holder.

5 Claims, 3 Drawing Sheets

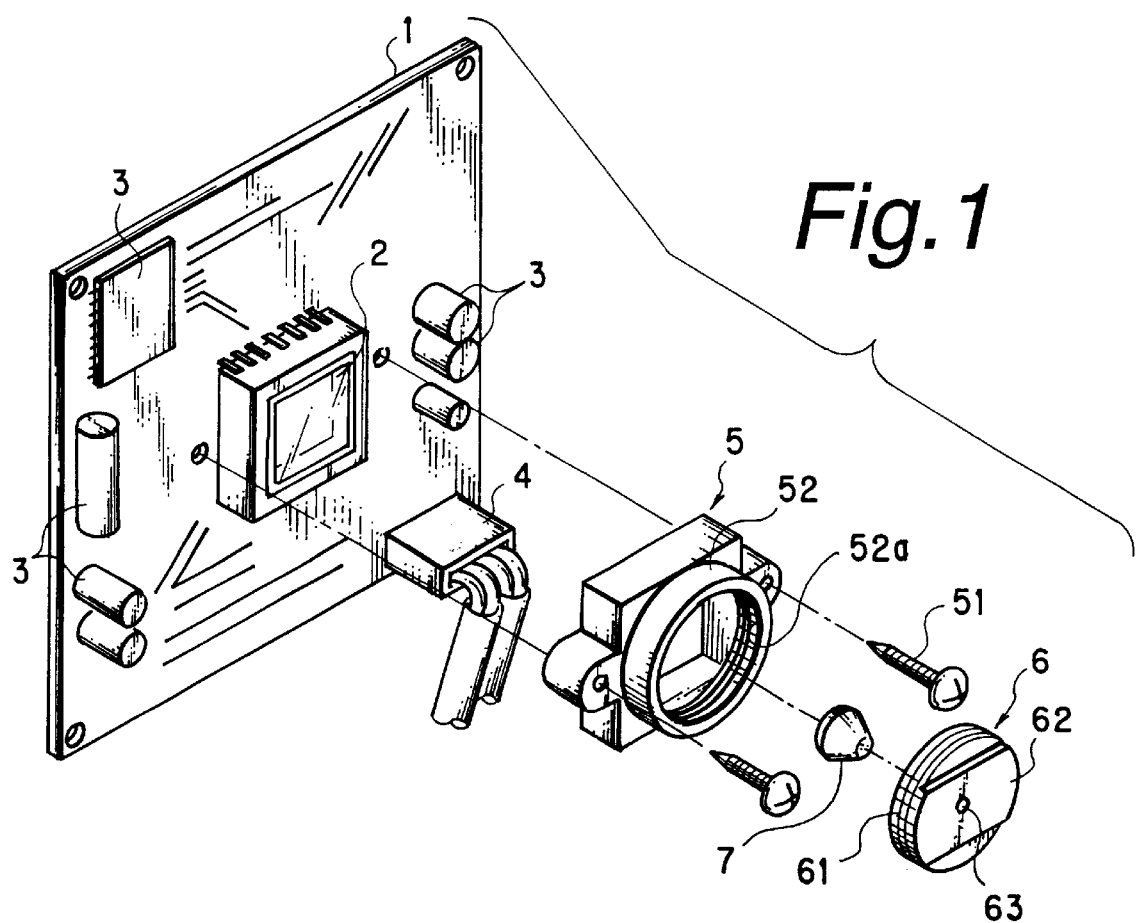

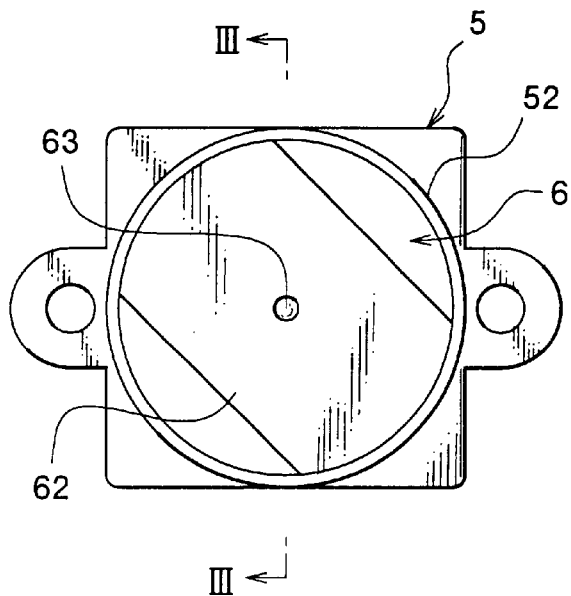
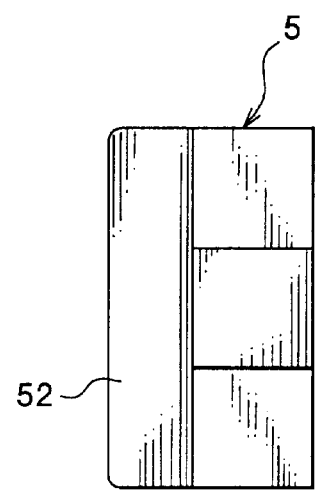
Fig.2(A)　Fig.2(B)
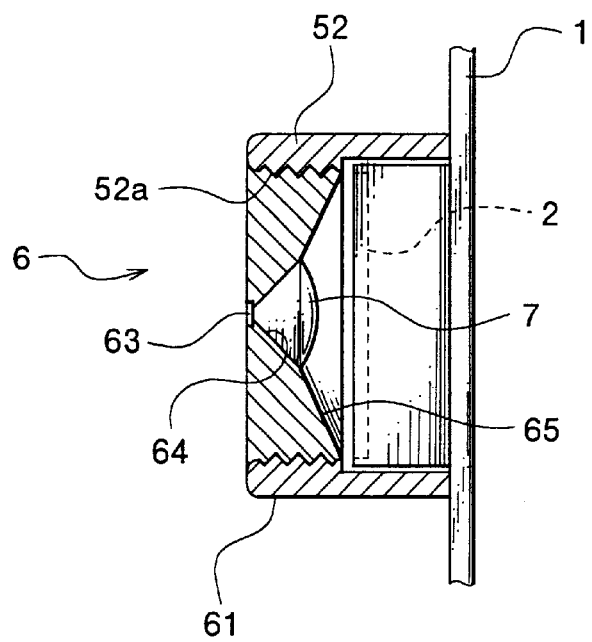
Fig.3

PINHOLE VIDEO CAMERA

BACKGROUND OF THE INVENTION

1. Field of the Invention

The present invention relates a pinhole video camera as a non-focus video camera.

2. Description of the Related Art

Generally, a pinhole video camera, which changes, without focusing, image of a subject in an range from a point closely adjacent to the camera to a point far from the camera into electrical signals, utilizes ¼-inch fixed charged coupled device.

SUMMARY OF THE INVENTION

However, in the above-mentioned conventional pinhole video camera, overall area of the charged coupled device can not effectively be utilized due to fisheye characteristics of a lens disposed between the fixed charged coupled device and the pinhole. As a result, with the conventional pinhole camera, it is impossible to take pictures because of low luminance, and there is a problem that it is impossible to adjust focus of a subject in an range from a point closely adjacent to the camera to a point far from the camera, resulting in unclear image.

The present invention has been made in consideration of the above-mentioned problems, and it is therefore an object of the present invention is to provide a pinhole camera in which a conical lens with an apical angle of 91.13° to 91.15° is used to correct the fisheye characteristics, and ⅓-inch fixed charged coupled device and a pinhole with a diameter of 0.8 mm are adopted to obtain clear image of a subject in an range from a point closely adjacent to the camera to a point far from the camera with strong contrast.

In order to accomplish the aforementioned objects, the pinhole video camera according to the present invention comprises: a printed circuit board to which ⅓-inch fixed coupled charged device is attached; a holder fixed so as to cover a front surface of the coupled charged device of the printed circuit board; a lens holder having a pinhole with a diameter of 0.8 mm; a conical convex lens with an apical angle of 91.13° to 91.15°, the conical convex lens fixed on a rear face side of the pinhole of the lens holder.

In the above-mentioned pinhole video camera, the lens holder may be movable in relation to the holder in a direction of a thickness of the fixed coupled charged device.

Further, in the pinhole video camera described above, it is possible to provide a coaxial cable, and the coaxial cable comprises: a central conductor; a first cylindrical screened conductor disposed outside of the central conductor through an insulating body; a second cylindrical screened conductor disposed outside of the first cylindrical screened conductor through an insulating body; and an outer covering covering an outer periphery of the second screened conductor, wherein the first and second cylindrical screened conductors are used for supplying current to drive the pinhole video camera.

Still further, in the coaxial cable described above, the first and second cylindrical screened conductor may comprise aluminum foil and a metal knit conductor covering the aluminum foil.

Further, in the pinhole video camera according to the present invention may further comprise a connector for connecting the coaxial cable to the pinhole video camera, and the connector comprises a plug connected to an end of the coaxial cable and a plug receptacle fixed to the pinhole video camera, and the plug comprises: a pin-shaped central contact connected to the central conductor of the coaxial cable; a cylindrical outer contact disposed outside of the pin-shaped central contact in such a manner as to cover the pin-shaped central contact through an insulating body, the cylindrical outer contact being connected to the first cylindrical screened conductor of the coaxial cable; and a cylindrical housing disposed outside of the cylindrical outer contact in such a manner as to cover the cylindrical outer contact through an insulating body, and the cylindrical housing being connected to the second cylindrical screened conductor of the coaxial cable, the plug receptacle comprises: a cylindrical housing with a flange at an axially intermediate portion thereof on an outer periphery thereof, a portion of the cylindrical housing on a side opposite to a side that the plug is connected with the flange in between machined to be a screw, a nut engaged with the screw, the cylindrical housing inserted into and engaged with the cylindrical housing of the plug; a central contact formed on a central portion in the cylindrical housing, the central contact having an insertion portion of the pin-shaped central contact of the plug on a side thereof, the other side of the central contact projecting from one side of the cylindrical housing; a contact disposed so as to cover the central contact in the cylindrical housing through an insulating body, the contact connected to a cylindrical contact which is engaged with the cylindrical outer contact of the plug, the contact projecting from one side of the cylindrical housing; and a contact connected to the cylindrical housing through a conductor, the contact projecting in parallel with the central contact from one side of the cylindrical housing.

BRIEF DESCRIPTION OF THE DRAWINGS

The present invention will be more apparent from the ensuring description with reference to the accompanying drawings wherein:

FIG. 1 is an exploded perspective view of a pinhole video camera according to an embodiment of the present invention;

FIGS. 2(a) and 2(b) are a front view and a side view of a holder and a lens holder portion of the pinhole video camera shown in FIG. 1;

FIG. 3 is a cross-sectional view taken along the line A—A in FIG. 2(a);

DETAILED DESCRIPTION OF THE PROFFERED EMBODIMENT

Figure 4:
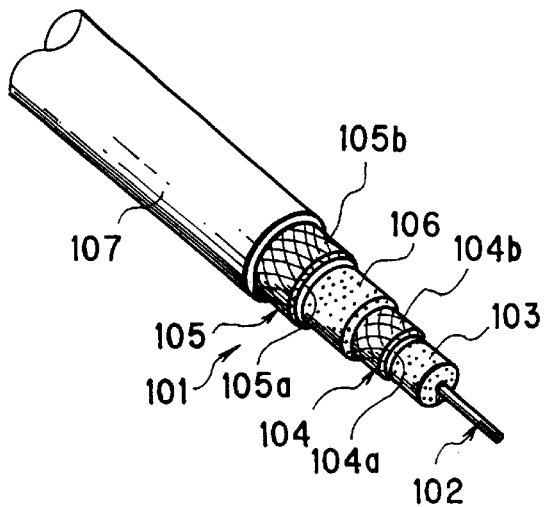
FIG. 4 is a perspective view of a coaxial cable used for the pinhole video camera shown in FIG. 1.

Embodiments of the present invention will be explained with reference to drawings.

FIG. 1 is an exploded perspective view of a pinhole video camera according to an embodiment of the present invention, in which reference numeral 1 shows a printed circuit board, 2 a fixed charged coupled device (hereinafter referred to as "CCD"), 3 memory means for storing a single frame image which is generated by image signal from the CCD 2 and an electronic part constituting signal converting means and the like as a known circuit for displaying the frame image to a displayer. Numeral 4 is a connector with wires to connect the aforementioned circuits to power source and the displayer.

Numeral 5 shows a holder which is formed to cover overall upper surface of the CCD 2 and is secured to the printed circuit board 1 through screws 51. On the front surface of the holder 5 is formed a cylindrical portion 52 and on the inner wall of the cylindrical portion 52 is formed a female screw portion 52a.

Numeral 6 shows a lens holder, and the peripheral face thereof is formed to be a male screw 61 which is engaged with the female screw portion 52a of the cylindrical portion 52. The lens holder 6 is provided with a tiered portion 62 which is touched by fingers to screw the lens holder 6 toward the front side. At the central portion of the lens holder 6 is formed a pinhole 63 with a diameter of 0.8 mm, and on the rear face of the lens holder 6 is disposed a conical lens accommodating hole 64 with a apical angle of 91.13° to 91.15°, and another conical space 65 with a wider apical angle in comparison to the conical lens accommodating hole 64 is integrally formed with the conical lens accommodating hole 64.

Numeral 7 is a conical convex lens which is accommodated in the conical lens accommodating hole 64, and the conical convex lens 7 is formed to have an apical angle of 91.13° to 91.15°, and the apex is fixed so as to face the pinhole 63. As described above, since the angle of incident light to the conical convex lens 7 is adjusted to be 91.13° to 91.15°, the fisheye characteristics of the conical convex lens 7 can be corrected.

In the above-mentioned pinhole video camera with the above-mentioned construction according to the present invention, light from a subject and background enters the conical convex lens 7 through the pinhole 63 and is introduced into the CCD 2 under unfocused state. The rotary adjustment of the lens holder 6 allows the light from the conical convex lens 7 to fully enter the pinhole video camera.

In the pinhole video camera according to the present invention, the apical angle of the conical convex lens 7 is set to be 91.13° to 91.15° to correct the fisheye characteristics, so that in comparison to the conventional pinhole video camera, much clearer image is obtained in an range from a point closely adjacent to the camera to a point far from the camera, and the diameter of 0.8 mm, which is applied to the pinhole 63, is suitable for the ⅓-inch CCD 2, which permits strong contrast of image to be produced, resulting in clear image of a subject at considerably dark place through a displayer.

Next, a coaxial cable for the above-mentioned pinhole video camera and a connector for connecting the coaxial cable to the pinhole video camera according to the present invention will be explained.

Figure 5:
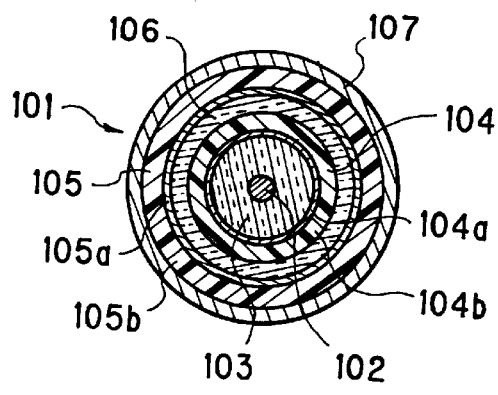
FIG. 5 is a cross-sectional view of the coaxial cable shown in FIG. 4.

FIG. 4 is a perspective view of a coaxial cable used for the pinhole video camera shown in FIG. 1, and FIG. 5 is a cross-sectional view of the cable.

In the figures, reference numeral 101 is a coaxial cable and 102 a central conductor made of copper, and the outside of the central conductor 102 is covered by the first cylindrical screened conductor 104 through an insulating body 103 made of polyethylene or the like.

Further, in the present embodiment, the first cylindrical screened conductor 104 comprises aluminum foil 104a and metal knit conductor 104b.

Numeral 105 is the second cylindrical screened conductor and is disposed outside of the first cylindrical screened conductor 104 through the insulating body 106. This second cylindrical screened conductor 105 comprises the aluminum foil 105a and the metal knit conductor 105b covering the aluminum foil 105a, like the first cylindrical screened conductor 104.

Further, numeral 107 is an outer covering made of insulating material which covers the outer periphery of the first cylindrical screened conductor 104.

The main characteristic of the coaxial cable according to the present invention, as described above, the first cylindrical screened conductor 104 and the second cylindrical screened conductor 105 are disposed outside of the central conductor 102 to use the conductors 104 and 105 for feeding electrical current for the pinhole video camera.

As a result, for example between a monitoring camera and a displayer, picture carrier is transmitted through the central conductor 102, and current for driving the monitoring video camera is supplied through the first cylindrical screened conductor 104 and second cylindrical screened conductor 105.

Further, when electrical current flows between the first cylindrical screened conductor 104 and the second cylindrical screened conductor 105 under the condition that the first cylindrical screened conductor 104 is plus side and the second cylindrical screened conductor 105 is minus side, the central space is not affected magnetically, which prevents the central conductor 102 from being magnetically affected.

On the other hand, when current flows between the first cylindrical screened conductor 104 and the second cylindrical screened conductor 105, magnetic action caused by the current forms a barrier to prevent jamming wave from entering the cable. As a result, picture carrier transmitted by the monitoring video camera is not disordered at all, resulting in clear displayed image without disorder.

Figure 6:
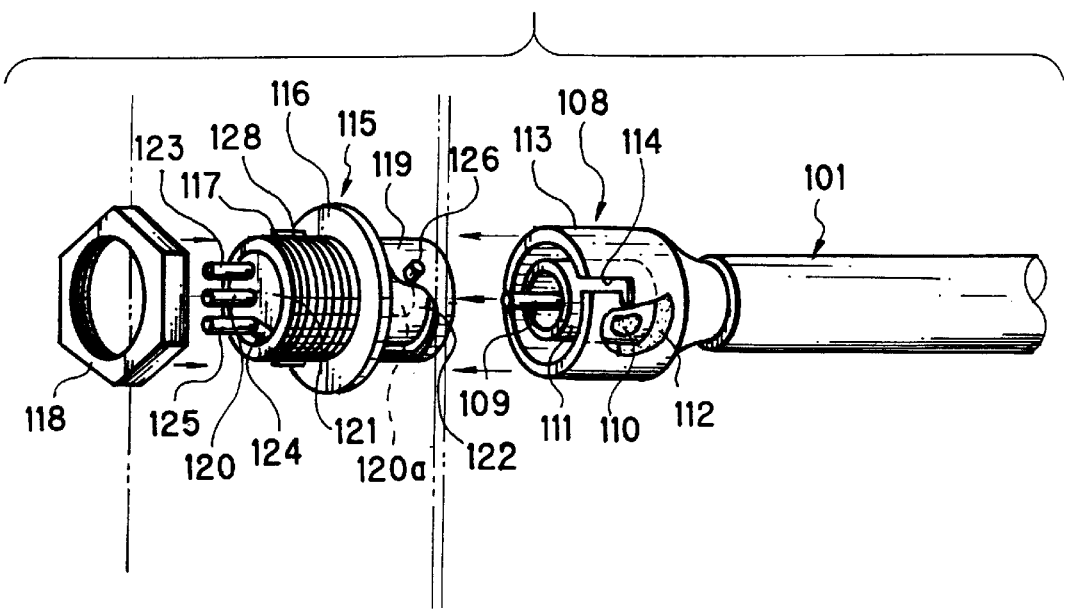
FIG. 6 is a perspective view of a connector used to connect the coaxial cable shown in FIG. 4 to the pinhole video camera shown in FIG. 1.

Next, a connector for connecting the above-mentioned coaxial cable to the pinhole video camera will be explained with reference to FIG. 6.

The connector comprises a plug which is attached to the coaxial cable and a plug receptacle which is secured to the pinhole video camera.

Numeral 108 is a plug comprising: a pin-shaped central contact 109 which is connected to the central conductor 102 of the coaxial cable 101; cylindrical outer contact 111 disposed outside of the pin-shaped central contact 109 in such a manner as to cover the pin-shaped central contact 109 through an insulating body 110, and the cylindrical outer contact 111 connected to the first cylindrical screened conductor 104 of the coaxial cable 101; and a cylindrical housing 113 disposed outside of the cylindrical outer contact 111 in such a manner as to cover the cylindrical outer contact 111 through an insulating body 112, and the cylindrical housing 113 connected to the second cylindrical screened conductor 105 of the coaxial cable 101. The cylindrical housing 113 is provided with a locking notch 114 for a connecting pin formed on a cylindrical housing of a plug receptacle described below. In place of the pin and the locking notch, fastening means with screws may be adopted.

Numeral 115 is a plug receptacle comprising: a cylindrical housing 119 with a flange 116 at the axially intermediate portion thereof on an outer periphery thereof, a portion of the cylindrical housing 119 on the side opposite to the side that the plug is connected with the flange 116 in between machined to be a screw, a nut 118 engaged with the screw 117, the cylindrical housing 119 inserted into and engaged with the cylindrical housing 113 of the plug 108; a central contact 120 formed on the central portion in the cylindrical housing 119, the central contact 120 having an insertion portion 120a of the pin-shaped central contact 109 of the plug 108 on a side thereof, the other side of the central contact 120 projecting from one side of the cylindrical housing 119; a contact 123 disposed so as to cover the central contact 120 in the cylindrical housing 119 through the insulating body 121, the contact 123 connected to a cylindrical contact 122 which is engaged with the cylindrical outer contact 111 of the plug 108, the contact 123 projecting from one side of the cylindrical housing 119; and a contact 125 connected to the cylindrical housing 119 through a conductor 124, and the contact 125 projecting in parallel with the central contact 120 from one side of the cylindrical housing 119. Numeral 126 shows a connecting pin provided on the outer periphery of the cylindrical housing 119.

In order to connect the plug receptacle 115 to the pinhole video camera, for example as illustrated in FIG. 3, a hole 128 is formed on the side wall 127 of the pinhole video camera, and the screw 117 of the plug receptacle 115 is inserted into the hole 128, and the nut 118 is engaged with the screw 117 which inwardly projects from the side wall of the case of the pinhole video camera to cramp the side wall 127 of the case with the nut 118 and the flange 116. When, the plug 108 is connected to the plug receptacle 115, the central conductor 102 of the plug receptacle 115 is continued to the central contact 120 of the plug receptacle 115 through the pin-shaped central contact 109, and the first cylindrical screened conductor 104 of the coaxial cable 101 is continued to contact 123 of the plug receptacle 115 through the cylindrical outer contact 111 of the plug 108, further, the second cylindrical screened conductor 105 of the coaxial cable 101 is continued to the contact 125 of the plug receptacle 115 through the cylindrical housing 113 of the plug 108.

With the coaxial cable with the above-mentioned construction, only a single coaxial cable not only transmits signals (original function) but also feeds current for driving the pinhole video camera, and a coaxial cable and a wire, which are conventionally separated from each other, are combined to a single cable, resulting in considerable reduction in costs and improved workability in wiring. In addition to the above, with the present invention, only one cable is wired on a wall, which is favorable in appearance.

With the coaxial cable according to the present invention, not only magnetic trouble accompanied by wiring is eliminated, but a magnetic barrier effectively prevents the intrusion of jamming wave from outside. Further, the first and the second cylindrical screened bodies may be formed by aluminum foil and metal knit conductor to provide much favorable condition of the cylindrical body in comparison to that made of only metal knit conductor.

As described above, the coaxial cable according to the present invention are preferably used for the pinhole video camera to transmit signals and to supply current for driving the pinhole video camera.

The connector according to the present invention for the above-mentioned coaxial cable and the pinhole video camera provide simple connection through single shot, and the construction of the connector is simple and favorable in appearance.

What is claimed is:

1. A pinhole video camera comprising:
    a printed circuit board to which ⅓-inch fixed coupled charged device is attached;
    a holder fixed so as to cover a front surface of said coupled charged device of the printed circuit board;
    a lens holder having a pinhole with a diameter of 0.8 mm;
    a conical convex lens with an apical angle of 91.13° to 91.15°, said conical convex lens fixed on a rear face side of said pinhole of the lens holder.

2. The pinhole video camera as claimed in claim 1, wherein said lens holder is movable in relation to said holder in a direction of a thickness of the fixed coupled charged device.

3. The pinhole video camera as claimed in claim 1, further comprising a coaxial cable, said coaxial cable comprising:
    a central conductor;
    a first cylindrical screened conductor disposed outside of said central conductor through an insulating body;
    a second cylindrical screened conductor disposed outside of said first cylindrical screened conductor through an insulating body; and
    an outer covering covering an outer periphery of the second screened conductor,
    wherein said first and second cylindrical screened conductors are used for supplying current to drive said pinhole video camera.

4. The pinhole video camera as claimed in claim 3, wherein said first and second cylindrical screened conductor comprising aluminum foil and a metal knit conductor covering said aluminum foil.

5. The pinhole video camera as claimed in claim 3, further comprising a connector for connecting said coaxial cable to said pinhole video camera, said connector comprising a plug connected to an end of said coaxial cable and a plug receptacle fixed to said pinhole video camera,
    said plug comprising: a pin-shaped central contact connected to the central conductor of said coaxial cable;
    a cylindrical outer contact disposed outside of the pin-shaped central contact in such a manner as to cover the pin-shaped central contact through an insulating body, said cylindrical outer contact being connected to the first cylindrical screened conductor of said coaxial cable; and
    a cylindrical housing disposed outside of the cylindrical outer contact in such a manner as to cover the cylindrical outer contact through an insulating body, and the cylindrical housing being connected to the second cylindrical screened conductor of said coaxial cable,
    said plug receptacle comprising: a cylindrical housing with a flange at an axially intermediate portion thereof on an outer periphery thereof, a portion of said cylindrical housing on a side opposite to a side that the plug is connected with the flange in between machined to be a screw, a nut engaged with said screw, said cylindrical housing inserted into and engaged with said cylindrical housing of the plug;
    a central contact formed on a central portion in said cylindrical housing, said central contact having an insertion portion of said pin-shaped central contact of the plug on a side thereof, the other side of said central contact projecting from one side of the cylindrical housing;
    a contact disposed so as to cover said central contact in the cylindrical housing through an insulating body, said contact connected to a cylindrical contact which is engaged with the cylindrical outer contact of the plug, the contact projecting from one side of the cylindrical housing; and
    a contact connected to the cylindrical housing through a conductor, said contact projecting in parallel with the central contact from one side of the cylindrical housing.

* * * * *